US012716982B2

(12) United States Patent
Hill et al.

(10) Patent No.: US 12,716,982 B2
(45) Date of Patent: Aug. 25, 2026

(54) METHODS FOR ENABLING ESTIMATION OF A POSITION OF A WIRELESS TERMINAL, A FIRST WIRELESS NODE AND A POSITIONING NODE

(71) Applicant: Sony Group Corporation, Tokyo (JP)

(72) Inventors: Johan Hill, Lund (SE); Jose Flordelis, Lund (SE); Yujie Zhang, Lund (SE); Basuki Priyanto, Lund (SE)

(73) Assignee: Sony Group Corporation, Tokyo (JP)

(*) Notice: Subject to any disclaimer, the term of this patent is extended or adjusted under 35 U.S.C. 154(b) by 219 days.

(21) Appl. No.: 18/708,752

(22) PCT Filed: Nov. 22, 2022

(86) PCT No.: PCT/EP2022/082785
§ 371 (c)(1),
(2) Date: May 9, 2024

(87) PCT Pub. No.: WO2023/094372
PCT Pub. Date: Jun. 1, 2023

(65) Prior Publication Data

US 2025/0020755 A1 Jan. 16, 2025

(30) Foreign Application Priority Data

Nov. 26, 2021 (SE) .................................... 2151444-3

(51) Int. Cl.
*G01S 5/02* (2010.01)
*G01S 5/00* (2006.01)

(52) U.S. Cl.
CPC .......... *G01S 5/0218* (2020.05); *G01S 5/0036* (2013.01); *G01S 2205/02* (2020.05)

(58) Field of Classification Search
CPC ............................ G01S 5/0218; G01S 5/0036
(Continued)

(56) References Cited

U.S. PATENT DOCUMENTS

| | | | |
|---|---|---|---|
| 10,908,299 | B1 | 2/2021 | Tadayon et al. |
| 2020/0228272 | A1 | 7/2020 | Soriaga et al. |

(Continued)

FOREIGN PATENT DOCUMENTS

| | | | |
|---|---|---|---|
| CN | 111819872 | A | 10/2020 |
| WO | 2021160434 | A1 | 5/2021 |
| WO | 2021142609 | A1 | 7/2021 |

OTHER PUBLICATIONS

International Search Report and Written Opinion from corresponding International Application No. PCT/EP2022/082785, mailed on Mar. 13, 2023, 17 pages.

(Continued)

*Primary Examiner* — Harry K Liu
(74) *Attorney, Agent, or Firm* — Tucker Ellis LLP

(57) ABSTRACT

A method is disclosed, performed by a first wireless node for enabling estimation of a position of a wireless terminal. The method comprises receiving, from a positioning node, a message indicative of a trained prediction model for determining a line-of-sight, LoS, path associated with the first wireless node during positioning of the first wireless node. The method comprises receiving, from the second wireless node, a reference signal. The method comprises determining, based on the reference signal and the trained prediction model, a line-of-sight, LoS, path between the first wireless node and the second wireless node. The wireless terminal is one of the first wireless node and the second wireless node.

20 Claims, 9 Drawing Sheets

(58) Field of Classification Search
USPC .......................................................... 342/451
See application file for complete search history.

(56) References Cited

U.S. PATENT DOCUMENTS

2020/0229010 A1 7/2020 Soriaga et al.
2021/0136527 A1 5/2021 Tadayon et al.
2021/0160712 A1* 5/2021 Tadayon ............. H04W 64/006
2021/0321221 A1 10/2021 Yerramalli et al.
2023/0019644 A1* 1/2023 Amiri ................... G01S 5/0273

OTHER PUBLICATIONS

Office Action and Swedish Search Report from corresponding Swedish Application No. 2151444-3, mailed on Jun. 21, 2022, 12 pages.
Abolfathimomtaz, Abbas et al., “Efficient Non-Line-of-Sight Identification in Localization Using a Bank of Neural Networks”, 2021 IEEE 32nd Annual International Symposium on Personal, Indoor and Mobile Radio Communications (PIMRC), 2021, 5 pages.
ETSI, “5G; NR; Physical layer procedures for data (3GPP TS 38.214 version 16.7.0 Release 16)” Oct. 2021, 176 pages.
ETSI, “5G; NR; User Equipment (UE) radio access capabilities (3GPP TS 38.306 version 16.6.0 Release 16),” Oct. 2021, 155 pages.

* cited by examiner

METHODS FOR ENABLING ESTIMATION OF A POSITION OF A WIRELESS TERMINAL, A FIRST WIRELESS NODE AND A POSITIONING NODE

The present disclosure pertains to the field of wireless communications. The present disclosure relates to methods for enabling estimation of a position of a wireless terminal, a related first wireless node and a related positioning node.

BACKGROUND

Positioning is an important feature of the 3$^{rd}$ Generation Partnership Project (3GPP) Fifth Generation (5G) New Radio (NR), targeting high accuracy positioning of wireless terminals, such as wireless devices. Positioning in 5G NR is designed to support indoor factory deployments that require high accuracy positioning of objects for localization and automation purposes. For example, on a factory floor, it may be beneficial to locate assets and moving objects such as forklifts, or parts to be assembled. Similar needs exist in, for example, transportation and logistics.

Indoor factory deployments may however have many metal objects located in a transmission path between a base station and a wireless terminal, which may cause generation of many Non-Line of Sight (NLoS) components of radio signals transmitted from one or more base stations. A Line of Sight (LoS) component of a radio signal may herein be understood as a component of a radio signal transmitted to the wireless terminal either in a straight or direct path free of any form of obstruction, or as a radio signal transmitted in a straight or direct path to the wireless terminal through an obstructing material, but leaving sufficient transmission for radio waves to be detected. An NLoS component of a radio signal on the other hand is a component of the transmitted radio signals that is not a LoS component. In other words, the NLoS component is a component that is not directly transmitted from the base station to the wireless terminal but is propagated and reflected by one or more external objects, such as metal objects in the indoor factory deployment. The transmitted signal from the base station may be reflected one or a plurality of times prior to the reception at the wireless terminal.

Typically, NLoS components arise from reflections of the radio signals on scattering objects located in the propagation environment.

An issue in an indoor deployment scenario is the existence of multipath components. Multipath is a propagation phenomenon resulting in a radio signal reaching a receiving antenna, such as an antenna of the wireless terminal in Downlink (DL) or an antenna of a base station in Uplink (UL), by two or more paths and may be caused by reflection of the transmitted signal from external objects. The transmitted radio signal may be received by the wireless terminal as an LoS component. The transmitted radio signal may however also be propagated and reflected by the external objects which may create a second or more component of the radio signal, herein referred to as an NLoS component. The NLoS component can be more dominant, e.g., have a higher receive power, than the LoS component and may thus be selected by the wireless terminal for positioning measurements. The usage of NLoS components of the transmitted radio signal may however compromise the performance of the positioning estimation, particularly timing based positioning estimation. This is because NLoS components typically experience larger propagation delays, thereby introducing a positive bias in the position estimates.

SUMMARY

Accordingly, there is a need for a wireless node and a positioning network and methods performed therein for enabling positioning of a wireless terminal, which can mitigate, alleviate or address the shortcomings existing and provide a higher accuracy positioning of the wireless terminal.

A method is disclosed, performed by a first wireless node for enabling estimation of a position of a wireless terminal. The method comprises receiving, from a positioning node, a message indicative of a trained prediction model for positioning measurement and/or estimation purpose, such as determining a line-of-sight (LoS) path and its quality associated with the first wireless node during positioning of the first wireless node. The method comprises receiving, from a second wireless node, a reference signal. The method comprises determining, based on the reference signal and the trained prediction model, an LoS path between the first wireless node and the second wireless node. The wireless terminal is one of the first wireless node and the second wireless node.

Further, a first wireless node is provided, the first wireless node comprising memory circuitry, processor circuitry, and a wireless interface, wherein the first wireless node is configured to perform any of the methods disclosed herein relating to the first wireless node.

It is an advantage of the present disclosure that a positioning accuracy of the wireless terminal can be increased. By applying a prediction model trained by a positioning node based on measurements performed by one or more reference wireless nodes, a more accurate identification of an LoS path may be achieved resulting in an improved positioning accuracy of the wireless terminal. By identifying the LoS path in first wireless node, a reporting payload from the first wireless node may be reduced since a measurement report transmitted to the positioning node may be limited to measurements related to the LoS-path. In other words, the first wireless node may refrain from reporting measurements for paths that are not LoS paths.

A method is disclosed, performed by a positioning node, for enabling positioning of a wireless terminal. The method comprising transmitting, to the first wireless node, a message indicative of the trained prediction model, to be used for determining a line-of-sight (LoS) path between the first wireless node and a second wireless node during positioning of the first wireless node. The method comprises receiving, from the first wireless node, a positioning measurement report, wherein the positioning measurement report is indicative of a determined LoS path between the first wireless node and the second wireless node. The wireless terminal is one of the first wireless node and the second wireless node.

Further, a positioning node is provided, the positioning node comprising memory circuitry, processor circuitry, and a wireless interface, wherein the positioning node is configured to perform any of the methods disclosed herein relating to the positioning node.

It is an advantage of the present disclosure that a positioning accuracy of the wireless terminal can be increased. By providing a trained prediction model for identification of an LoS path to the first wireless node, the positioning node enables the first wireless node to identify the LoS path more accurately. The trained prediction model can be obtained from one or more reference wireless nodes that are located surrounding of the first wireless node in which it may provide accurate radio channel conditions and environments of the first wireless node. Hence, LoS path can be identified accurately. A more accurate identification of the LoS path in the first wireless node further reduces the reporting payload from the first wireless node to the positioning node since the measurement report transmitted to the positioning node may be limited to measurements related to the LoS-path. In case of UE-assisted positioning method, receiving a more accurately identified LoS path as part of the positioning measurement report allows the positioning node to improve the positioning accuracy of the wireless terminal. In case of UE-based positioning method, obtaining a more accurate identified LoS path will improve the positioning accuracy of the wireless terminal itself.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1A:
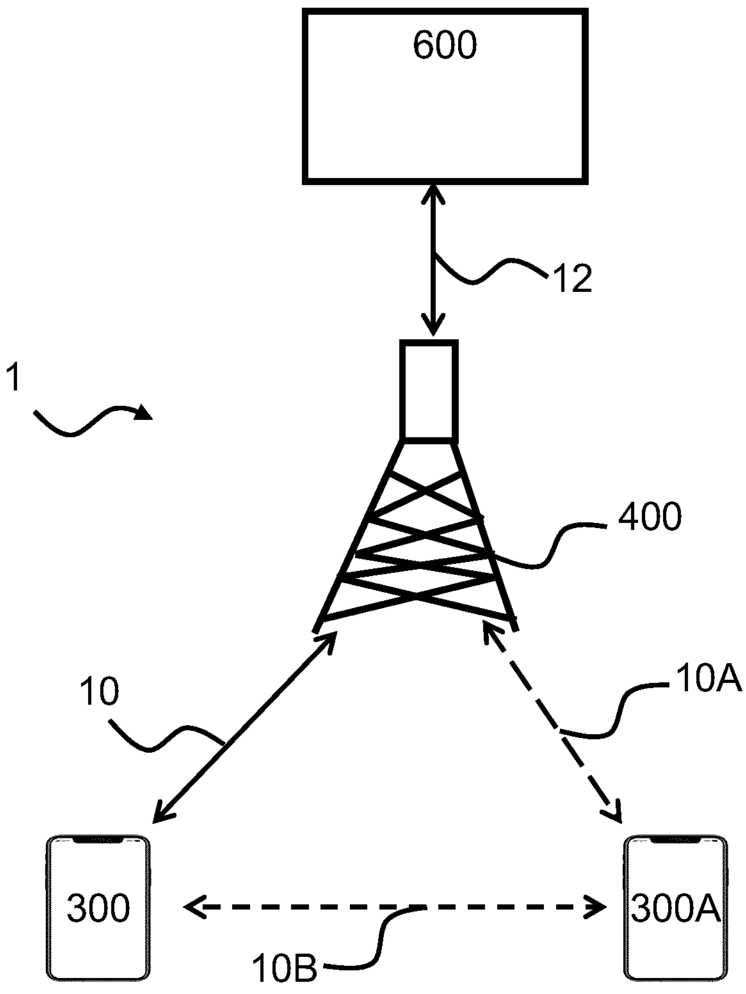
FIG. 1*a* is a diagram illustrating an example wireless communication system comprising example network nodes and an example wireless terminal according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example need not have all the aspects or advantages shown. An aspect or an advantage described in conjunction with a particular example is not necessarily limited to that example and can be practiced in any other examples even if not so illustrated, or if not so explicitly described.

In the context of positioning in 3GPP, two steps are typically involved: a positioning measurement performed by a measurement node, and a positioning estimate performed by a positioning node based on received and/or computed positioning measurements from the measurement node. The measurement node may be a wireless terminal, such as a UE, for DL-based positioning and a base station, such as a Transmission Point (TRP), for UL-based positioning. The positioning node may be a positioning network node, such as a Location server (LS) or Location Management Function (LMF) for UE-assisted/network-based positioning and a wireless terminal, such as a UE, for UE-based positioning.

By the measurement node performing measurements, such as positioning measurements, on an LoS component of a signal from a second wireless node (such as from a wireless node or a wireless terminal), the positioning accuracy of the wireless terminal can be improved. To increase accuracy, for example using multilateration or multiangulation during DL positioning, the measurement node, such as the wireless terminal, may determine LoS components from multiple other wireless nodes, such as TRPs. Multilateration herein means that the measurement node measures on signals received from multiple wireless nodes and determines, for example, a time difference of arrival (TDoA) of the signals from the multiple wireless nodes. The TDoA of the signals is further used to determine a position of the wireless terminal based on the respective distances between the wireless terminal and the transmitter of each respective signal.

Multiangulation herein means that the measurement node measures on signals received from multiple wireless nodes and determines, for example, the received signal strength of the signals from the multiple wireless nodes. The angle of reception of each respective signal is used to determine a location of the wireless terminal. The second wireless node may be a base station and/or a wireless terminal. In an indoor scenario, particularly in Industrial IoT (IoT) scenario, the environment is rich with NLoS components, such as signals received via an NLoS path. Hence, to increase accuracy, the NLoS components need to be mitigated so that the positioning measurement to be used for the positioning estimation is based on an LoS component.

In DL positioning, a wireless terminal may receive a multipath channel attenuated signal. The wireless terminal may perform cross correlation between the received signal and a known reference signal to obtain a power delay profile (PDP). The PDP is an estimation of a delay domain of the channel. Since the LoS signal always arrives first, the wireless terminal can identify the first arrival path in the PDP as the LoS path. However, the LoS signal strength can be very weak in an NLoS dominated channel. In such a case, the wireless terminal may detect an incorrect path as an LoS path, as the first arrival path observed in the PDP can be a strong reflection, especially if the LoS path signal is weak as it may be mistakenly identified by the receiver as noise.

Legacy methods for identifying the LoS path are typically threshold-based (TH-based). However, the accuracy given by said TH-based methods may not be sufficient for certain applications.

To overcome these drawbacks, the current disclosure proposes using machine learning, such as a neural network, for determining the LoS path. A neural network is a class of machine learning algorithms used to model complex patterns in datasets using multiple hidden layers and non-linear activation functions. According to the current disclosure, the neural network may be trained to identify the LoS path among multiple path components. Experiments and simulations have shown that the neural network-based solution according to the current disclosure outperforms the traditional TH-based methods. By using the neural network-based positioning method according to this disclosure, commercial and industrial level positioning requirements in scatter rich environments, especially in NLoS-dominant environments can be fulfilled.

The figures are schematic and simplified for clarity, and they merely show details which aid understanding the disclosure, while other details have been left out. Throughout, the same reference numerals are used for identical or corresponding parts.

FIG. 1*a* is a diagram illustrating an exemplary wireless communication system 1 comprising an exemplary base station 400 and an exemplary wireless terminal 300 according to this disclosure.

As discussed in detail herein, the present disclosure relates to a wireless communication system 1 comprising a cellular system, such as a 3GPP wireless communication system. The wireless communication system 1 comprises a wireless terminal 300, a base station 400 and a network node 600, such as a core network node.

A base station 400 disclosed herein may refer to a radio access network node operating in the radio access network, such as an evolved Node B (eNB) or a 5G radio access network node referred to as a gNB. An eNB or gNB comprises one or more transmission point(s), TRP(s). Depending on the operating carrier frequency, a gNB may be operated with single or multiple beam transmission. Single beam is often referred as omni-directional transmission and typically used in lower frequencies (such as Frequency Range 1 in 5G New Radio). Multiple beam is typically used in Frequency Range 2 (FR2) (24 GHz and above) in order to compensate for path-loss. Multiple beams consist of multiple narrow beams. A narrow beam has a higher gain than a single beam with omni-directional transmission.

The wireless communication system 1 described herein may comprise one or more wireless terminals 300, 300A, and/or one or more base stations 400, such as one or more of: a base station, an eNB, a gNB and/or an access point. The wireless communication system 1 may be arranged in an indoor and/or an outdoor environment A network node 600 disclosed herein may refer to a core network node, such as a Location Server (LS), a Location Management Function (LMF) or an evolved Serving Mobile Location Center (e-SMLC). In some examples the network node and the base station may be separate nodes or collocated nodes.

A wireless terminal 300 may refer to a wireless device, a mobile device and/or a user equipment (UE).

The wireless terminal 300, 300A may be configured to communicate with the base station 400 via a wireless link (or radio access link) 10, 10A, such as via a 3GPP Universal Mobile Telecommunications System (UMTS) air interface, such as a Uu interface. In the following the wireless terminal 300 and/or the base station 400 may be referred to as wireless nodes.

The network node 600 may be configured to communicate with the base station 400 and/or the wireless terminal 300, 300A via link 12.

The wireless terminals 300, 300A may, in one or more examples, be configured to communicate with each other via a wireless link 10B, such as a sidelink, which can also be known as a 3GPP PC5 interface. In one or more example networks, the wireless link 10B may use a different radio protocol than the radio protocol used for the wireless link 10, 10A. In one or more example networks, the wireless link 10B operates on a different frequency band than the wireless link 10, 10A. In one or more examples such wireless link 10B may operate on an unlicensed/shared frequency band.

Figure 1B:
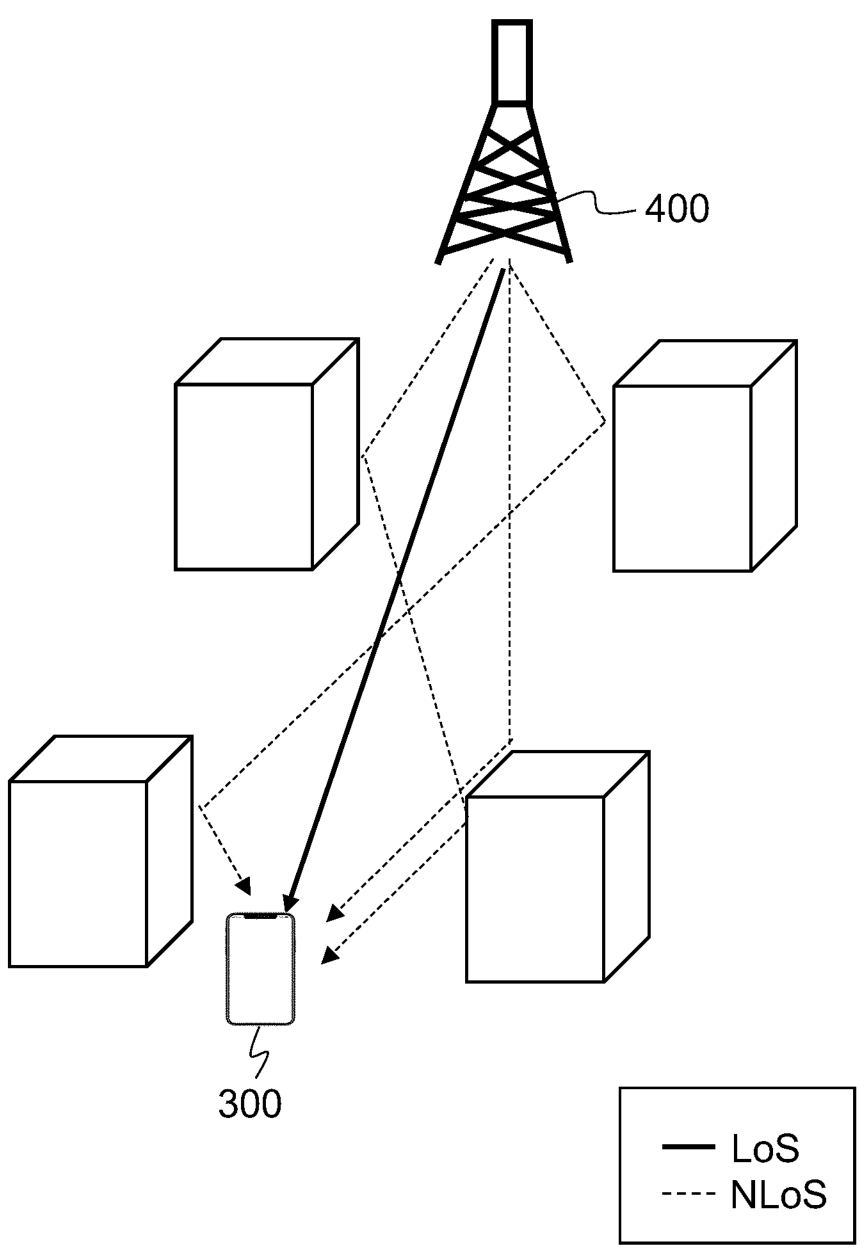
FIG. 1*b* is a diagram illustrating LoS and NLoS components of an exemplary multipath transmission.

FIG. 1*b* shows an illustration of a scenario in which signals, such as reference signals, transmitted to or from a wireless terminal are split up in to LoS and NLoS paths, which may also be referred to as LoS and NLoS components. The LoS component of a radio signal may herein be understood as a component of a radio signal transmitted to or from the wireless terminal 300 (from or to the base station 400 or a second wireless terminal) either in a straight line free of any form of obstruction, illustrated with a solid line in FIG. 1*b*, or as a radio signal transmitted in a straight line to the wireless terminal 300 through an obstructing material, but leaving sufficient transmission energy for radio waves to be detected. The NLoS component of the radio signal on the other hand is a component of the transmitted radio signals that is not an LoS component, such as a component that is not directly transmitted from/to the base station to/from the wireless terminal but is propagated and/or reflected by one or more external objects, illustrated by the blocks in FIG. 1*b*. The one or more external objects may for example be metal objects in an indoor factory deployment. The NLoS components are illustrated with dashed lines in FIG. 1*b*. Hence, measurements based on NLoS components do not represent the true propagation time of the LoS between the base station and the wireless terminal and may introduce a timing error into the measurements. The timing error may become severe in indoor factory environments since the transmission paths may be obstructed by a large number of metal objects, such as shelfs, walls and/or stored products.

The current disclosure provides a solution to the above-mentioned problem by introducing a procedure for detection and/or estimation of LoS components of the received reference signals at the receiver side, such as at the wireless terminal for DL or sidelink positioning measurements and at the base station (such as a TRP) for UL positioning measurements, and its required signaling to enable the feature and measurement report procedure. For UL based positioning in which multiple base-stations (such as TRPs) receive the reference signal from the wireless terminal, each base station may perform a positioning measurement and may report its measurement to the positioning network node, such as the LS or LMF.

Figure 2A:
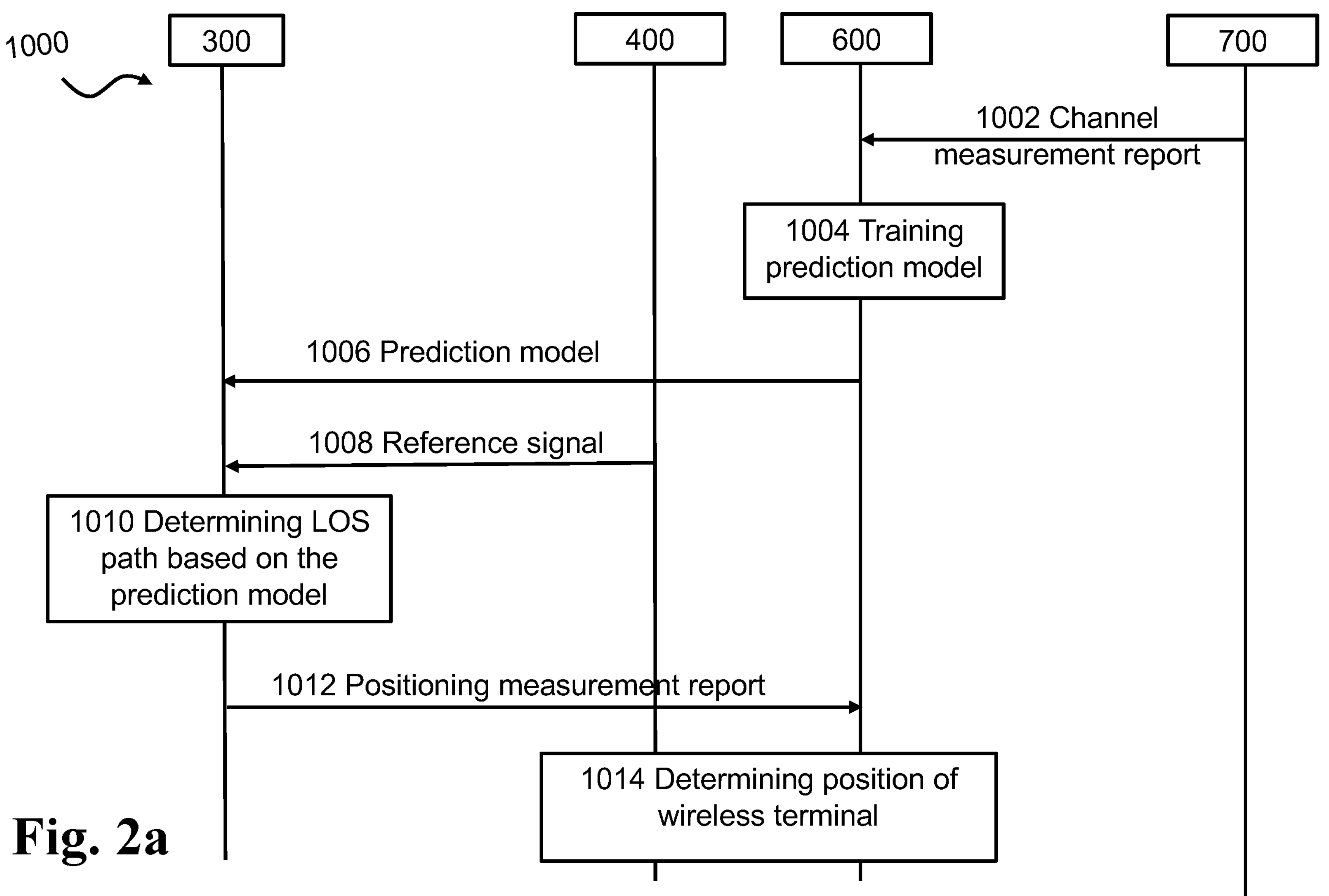
FIG. 2*a* is a signaling diagram illustrating an example message exchange for enabling positioning of a wireless terminal during DL positioning according to the current disclosure.

FIG. 2*a* is a signaling diagram illustrating an example message exchange 1000 between a first wireless node, a second wireless node, a reference wireless node 700 and a positioning node, such as a positioning network node 600 for enabling positioning of a wireless terminal according to one or more example methods disclosed herein. In the example method disclosed in FIG. 2*a*, the positioning measurement is performed in DL. Hence, in the example shown in FIG. 2*a*, the first wireless node is a wireless terminal 300, the second wireless node is a base station 400 and the positioning node is a positioning network node 600, such as an LS and/or an LMF.

In one or more example methods, the reference wireless node 700 provides input to the positioning network node 600 for pre-calculating, such as training, the prediction model. The reference wireless node 700 may perform a channel measurement and may send channel measurement information 1002 associated with the reference wireless node 700 to the positioning network node 600. The channel information may comprise one or more of observed power delay profiles, power angular profiles, power metrics, path power information, path delay information, path angle of arrival (AoA) information, path complex amplitude, path polarization properties, signal-to-noise ratio (SNR), geographical coordinates (such as true geographical coordinates in a form of longitude and latitude information, for example obtained using a Global Positioning System (GPS), time-stamp, and channel characteristics, that may be used to identify an LoS path of the channel. The reported channel measurement can be associated to receive (Rx) and/or transmit (Tx) spatial filter (beam). For example, in DL-based positioning, the reported channel measurements can be associated to the Rx beam of the reference wireless node for the reception of reference signal and/or the Tx beam of the wireless node (e.g., TRP) for the transmission of the reference signal. This may correspond to S103 described in relation to FIG. 4.

In one or more example methods, the positioning network node 600 may, based on the channel measurement information received from the reference wireless node, train one or more prediction models 1004 for a neural network. The prediction models may be trained to identify the LoS path given the known exact location of the reference wireless node 700. The positioning network node 600 may set the reported measurement from the reference wireless node as an input together with and the actual location of the reference wireless node in machine learning computation and the trained prediction model as the expected output. A weight in the prediction model can be adjusted and optimized based on the input and output via various algorithms, such as gradient based algorithms. This may correspond to S105 described in relation to FIG. 4.

In one or more example methods, the positioning network 600 node transmits a message indicative of the trained prediction model 1006 to the wireless terminal 300. The trained prediction model may be used by the wireless terminal 300 to determine an LoS path of a channel between the wireless terminal 300 and the base station 400. In one or more example methods, the positioning network node 600 communicates a universal trained prediction model. The universal trained prediction model may be a model useable by any wireless terminal for estimating the LoS path for that wireless terminal in one of a plurality of different environments and scenarios. The universal trained prediction model may, typically, be unnecessarily large for a single wireless terminal to store, as the wireless terminal would not need to calculate an LoS path in multiple different environment types at the same time. The wireless terminal may only determine the LoS path in its current environment, and therefore may only use a trained prediction model associated with its current environment.

In one or more example methods, the positioning network node 600 communicates a prediction model to the wireless terminal, associated with the environment that the wireless terminal operates in to the first wireless node, which in the DL case is the wireless terminal. The prediction model associated with the environment that the wireless terminal operates in may be of a smaller size than the universal trained prediction model and may thus reduce the overhead to be transmitted for the purpose of LoS detection. By communicating a trained prediction model being associated to the environment that the wireless terminal operates in the accuracy of the positioning of the wireless terminal may be increased. The message indicative of the trained prediction model may correspond to S107 described in relation to FIG. 4 and S203 described in relation to FIG. 3.

In one or more example methods, the trained prediction model may have a predetermined size and the prediction model type (e.g., universal prediction model), and the prediction model associated with the environment, such as with a specific base station, area, etc., may differ in the size of the training data set, such as the number of reference wireless nodes, used for training the model.

The positioning network node 600 may indicate a time validity of the reported prediction model, such as a time duration for which the reported prediction model is valid. Since the prediction model may change with the environment and the state of the wireless terminal the wireless terminal 300 may be provided, by the positioning network node 600, with updated prediction models after a period of time. The updated prediction models may account for a change in environment and/or state of the wireless terminal. In one or more example methods, the model may depend on the device type.

The prediction model may be transmitted to the wireless terminal 300 via a base station 400. In one or more example methods, the prediction models may be a multi-dimensional matrix comprising weights, such as having weights as entries. The size of the prediction matrix can be decided by the positioning network node 600, depending on the accuracy level that positioning network node 600 would like to achieve. In one or more example methods, the matrix may be two-dimensional. In one or more example methods, a structure (such as a number and types of stages, interconnections, etc.) of the prediction model, such as the predictive neural network, may be communicated. In one or more example methods, the structure may be predefined. A weight may herein be seen as a parameter within the neural network that transforms the input data, such as the parameters associated with the channel measurement performed by the first wireless node, within the prediction model. When the trained prediction model is applied to input data, such as to a parameter of the channel measurement, the input data may be multiplied by the weight value and the resulting output may be observed to determine the LoS path. The weights may be arranged in the matrix such that a respective weight is applied to a corresponding input parameter when the matrix is multiplied with the input data. In order to achieve this, the first wireless node may receive an indication of a measurement result format to be applied to the channel measurement, so that a corresponding weight is applied to each channel measurement parameter during multiplication of the matrix of the prediction model and the parameters of the channel measurement.

In one or more example methods, the trained prediction model may comprise non-linear transformations as part of some of the stages of the neural network. The non-linear transformations enable a modelling of non-linear relationships between dependent and independent variables of the trained prediction model. Thereby, the accuracy of the model may be increased when the input data shows a non-linear, such as a curved trend. The non-linear transformations can also be used to implement so-called activation functions. Activation functions can be used to decide whether or not certain features or stages of the neural network are active.

In one or more example methods, the trained prediction model may comprise adding a constant, or offset, as part of some of the stages of the neural network.

In one or more example methods, the positioning network node 600 may, instead of providing a universal prediction model, provide a prediction model associated with a cell and/or a base station, such as a gNB, which is only to be applied when communicating with the specific base station and/or cell. This type of prediction model typically has a smaller size than the universal model, thereby the reported signalling overhead can be reduced. In one or more example methods, an association between the prediction model and the cell and/or base station may be provided to the first wireless node by the positioning network node 600, for example by indicating a cell ID and/or a base station ID associated with the reported prediction model. The association can be interpreted by the first wireless node as an information so that the trained prediction model is obtained based on the reference wireless nodes that reported to that base station with specific cell ID and/or base station ID.

The positioning network node 600 may, in one or more example methods, indicate the measurement that the wireless terminal 300 should perform to create the multipath information (such as a matrix and/or a vector) to be used together with, such as to be provided as input to, the prediction model. This indication may include a measurement type and/or a format of the measurement result that is compatible with the prediction model.

In one or more example methods, the positioning network node 600 may transmit an indication indicative of a positioning measurement reporting format to be used by the first wireless node, such as the wireless terminal 300, when reporting the LoS path determined using the trained prediction model to the positioning network node 600.

The second wireless node, such as the base station 400, transmits reference signals 1008, such as a positioning reference signal (PRS) to the wireless terminal 300. The reference signals may be detected by the wireless terminal.

The wireless terminal 300 determines 1010, based on the received reference signals, an LoS path using the trained prediction model. The wireless terminal 300 may perform a positioning measurement on the received reference signals. The wireless terminal may then store the result from the positioning measurement in a format that is compatible with the trained prediction model, for example in a matrix or in a vector, comprising a measurement result for a plurality of signalling paths. When the matrix comprises measurement results for a plurality of signalling paths it may herein be referred to as a multipath matrix and/or a multipath information matrix. The wireless terminal 300 may apply the trained prediction model to the result from the positioning measurement to determine an LoS path and/or an NLoS path of the channel that the reference signals were received on. In one or more example methods, the trained prediction model may comprise weights which may be applied to the measurement result, such as by multiplication and/or by other further mathematical processing. This may herein be referred to as an inference part of the machine learning based method of detecting the LoS and/or NLoS path. In one or more examples, the wireless terminal 300 may calculate the LoS and/or NLoS path, by multiplication between a multipath information matrix measured by the wireless terminal and a trained prediction model matrix provided by the positioning network node 600. The multipath information matrix may comprise one or more of a signal quality, a time delay, and a signal strength power of each path, complex amplitude and polarization properties of paths, and impulse responses or frequency responses for which paths may or may not have been extracted. In one or more example methods, the output of the multiplication is the predicted index of the estimated LoS path and/or NLoS path. This may correspond to S207 described in relation to FIG. 3.

The wireless terminal 300 transmits a positioning measurement report 1012 to the positioning network node 600. In one or more example methods, instead of reporting a rich set of paths and parameters (such as multiple positioning reports based on various techniques, and/or a high number of paths), the positioning measurement report may comprise an LoS indication and/or NLoS indication, being indicative of the LoS path and NLoS path respectively. Thereby the signalling overhead may be reduced. The LoS indication and/or NLoS indication may be an LoS/NLoS indication as defined in 3GPP NR Rel-17. In one or more example methods, the positioning measurement report may comprise a quality of the indicated LoS path and/or NLoS path. The computation at the wireless terminal, such as the multiplication of the measurement and trained prediction model may produces the identified LoS path and its quality. High quality means the wireless terminal has high certainty/confident level of identified LoS path. In one or more example methods, the wireless terminal can report to the positioning network node 600 that the determination of the LoS path and/or NLoS path is based on the received trained prediction model. In other words, the positioning measurement report may comprise an indication indicating the trained prediction model that has been used by the wireless terminal to determine the LoS and/or NLoS path. The wireless terminal may transmit the positioning measurement report to the positioning network node 600 via the base station 400. The positioning measurement report may be in the positioning measurement reporting format indicated by the positioning network node 600. This may correspond to S109 described in relation to FIG. 4 and S209 described in relation to FIG. 3.

The positioning network node 600 determines 1014 the position of the wireless terminal based on the received positioning measurement report. In one or more example methods, the positioning measurement report comprises one or more of the LoS indication and the NLoS indication. In one or more example methods, the positioning measurement report may comprise only the LoS indication. The positioning network node 600 may be aware of the prediction model used for deriving the path and may determine the LoS path based on the LoS indication and the prediction model.

Figure 2B:
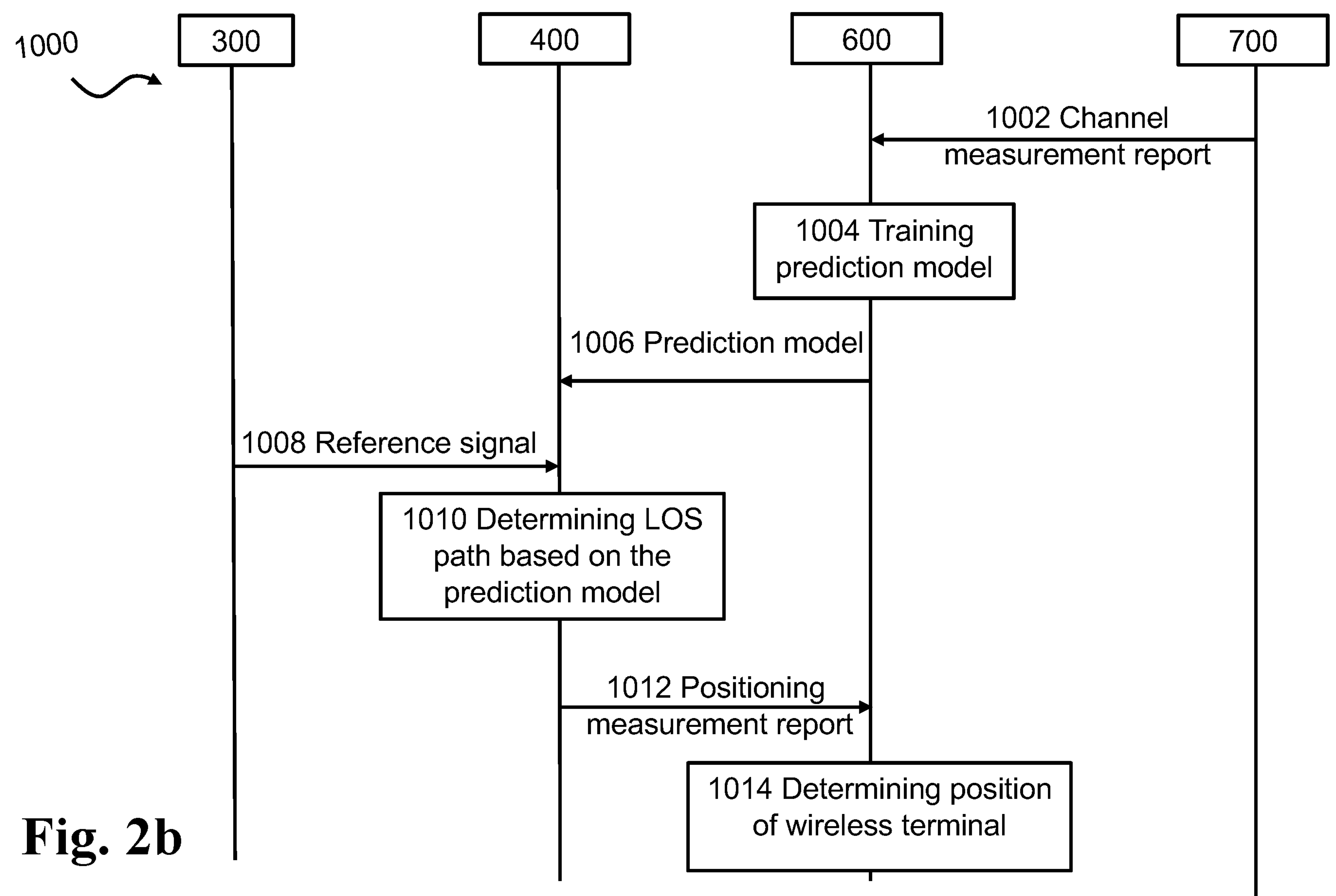
FIG. 2*b* is a signaling diagram illustrating an example message exchange for enabling positioning of a wireless terminal during UL positioning according to the current disclosure.

FIG. 2*b* is a signaling diagram illustrating an example message exchange 1000 between a first wireless node 400, a second wireless node 300, a reference wireless node 700 and a positioning node, such as a positioning network node 600 for enabling positioning of a wireless terminal according to one or more example methods disclosed herein. In the example method disclosed in FIG. 2*b*, the positioning measurement is based on UL signal and performed in base station (gNB/TRP). Hence, in the example shown in FIG. 2*b*, the first wireless node is a base station 400, the second wireless node is a wireless terminal 300 and the positioning node is a positioning network node 600, such as an LS and/or an LMF. The content of the signaling may correspond to the content of the signaling discussed in relation to FIG. 2*a*.

The method for UL positioning differs from the method for DL positioning in that, once the positioning network node has trained 1004 the prediction model, the positioning network node transmits the message indicative of the trained prediction model 1006 to the base station 400. The trained prediction model may be used by the base station 400 to determine an LoS path of a channel between the wireless terminal 300 and the base station 400.

The method for UL positioning differs from the method for DL positioning in that the second wireless node, in this case the wireless terminal 300, transmits reference signals 1008, such as a Sounding Reference Signal (SRS) or an enhanced SRS, dedicated for positioning purposes, to the first wireless node, in this case the base station 400.

The method for UL positioning differs from the method for DL positioning in that the base station 400 determines 1010, based on the received reference signals from the wireless terminal 300, an LoS path using the trained prediction model.

The method for UL positioning differs from the method for DL positioning in that the base station 400 transmits the positioning measurement report 1012 to the positioning network node 600.

Figure 3:
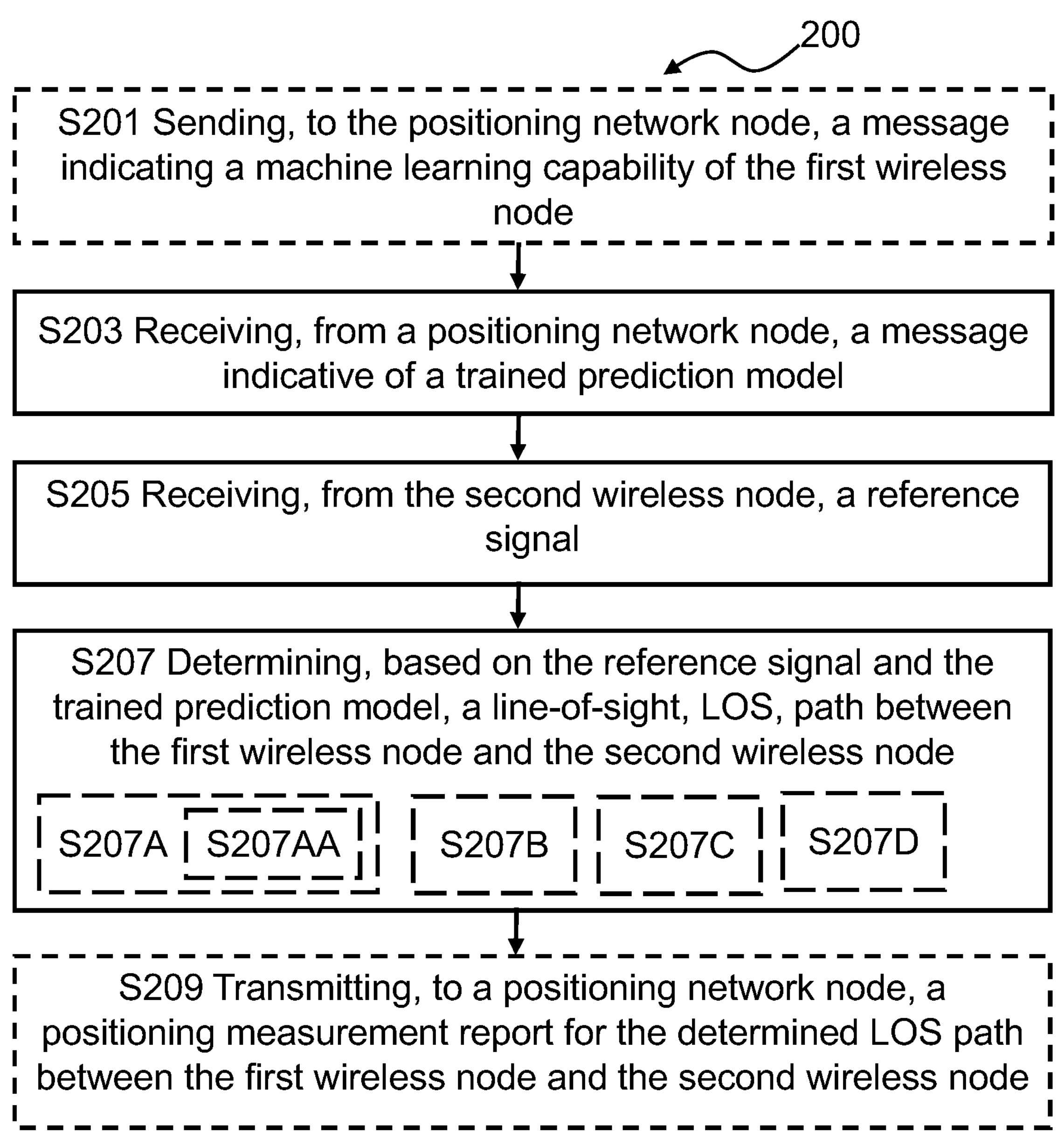
FIG. 3 is a flow-chart illustrating an example method, performed in a first wireless node, for enabling positioning of a wireless terminal according to this disclosure.

FIG. 3 shows a flow diagram of an example method 200 performed by a first wireless node according to the disclosure, for enabling estimation of a position of a wireless terminal. The first wireless node may be a measurement node for performing measurements on a signal, such as a reference signal, received from a second wireless node. The method 200 may be performed by a first wireless node 800 disclosed herein, such as by a wireless terminal 300, 300A or a base station 400 of FIG. 1*a* and the first wireless node 800 of FIG. 6.

In one or more example methods, the method 200 comprises sending S201, to the positioning node, a message indicating a machine learning capability of the first wireless node. The positioning node may be a positioning network node, such as an LS and/or an LMF, for UL and/or DL positioning methods. The positioning node may be a wireless terminal for sidelink positioning methods. In one or more example methods, the machine learning capability may be indicative of the first wireless node's capability to receive a trained prediction model, such as a machine learning model. In one or more example methods, the machine learning capability may be indicative of the first wireless node's capability to apply the trained prediction model, such as for determining an LoS path of the communication between the first wireless node and the second wireless node. The machine learning capability of the first wireless node may for example indicate what type of prediction models the first wireless node is configured to handle. The step S201 may correspond to step S101 performed by the positioning node and described in relation to FIG. 4.

In one or more example methods, the message indicating the machine learning capability is indicative of one or more of: a matrix size, a type of prediction model, a number of prediction model layers, a number of prediction model neurons, and a number of inferences per time unit for the trained prediction model that the first wireless node has capability to handle.

The method 200 comprises receiving S203, from a positioning node, a message indicative of the trained prediction model for determining an associated with the first wireless node, such as an LoS path between the first wireless node and the second wireless node, during positioning of the first wireless node. The positioning node may be an LS and/or an LMF. The message indicative of the trained prediction model may be received from the positioning node via a second node, such as via a base station or a second wireless terminal. In one or more example methods, the trained prediction model may be used for determining a quality of the LoS path. In one or more examples, by performing multiplication of the positioning measurement result and the trained prediction model, the positioning node may obtain an index of the LOS path as the output. In case the LoS-path is obtained with high-confidence then the quality of LoS path is expected to be high. The step S203 may correspond to step S107 performed by the positioning node and described in relation to FIG. 4, and message 1006 of the signaling diagram of FIG. 2*a* or 2*b*.

In one or more example methods, the trained prediction model comprises a matrix of weights, such as a multi-dimensional matrix comprising weights. The weight may herein be seen as a parameter within the neural network that transforms the input data, such as the parameters of the channel measurement performed by the first wireless node, within the prediction model. As an input, such as a parameter of the channel measurement, enters the prediction model, the input may be multiplied by the weight value and the resulting output may be observed to determine the LoS path. The weights may be arranged in the matrix such that a respective weight is applied to a corresponding input parameter when the matrix is multiplied with the input data. In order to achieve this, the first wireless node may receive an indication of a reporting format to be applied to the channel measurement, so that a corresponding weight is applied to each channel measurement parameter during multiplication of the matrix of the prediction model and the parameters of the channel measurement. The size of the matrix of the prediction model may be determined by the positioning node based on the machine learning capability of the first wireless node, depending on the accuracy level that the positioning network node and/or the first wireless node would like to achieve.

In one or more example methods, the message indicative of the trained prediction model is indicative of a full trained prediction model, such as a full trained prediction model matrix. This may for example be the case the first time the first wireless node receives a prediction model or there is a significant change in the environment where it affects the radio conditions between wireless terminal and wireless node(s). In one or more example methods, the message indicative of the trained prediction model is indicative of a part of the trained prediction model, such as of a part of the trained prediction model matrix. In one or more example methods, such as when the trained prediction model is updated, only the part of the trained prediction model that has been changed may be indicated. In one or more example methods, only a part of the trained prediction model that is relevant to the wireless terminal's current environment may be indicated, such as a part of the trained prediction model that enables and/or improves a determination of the LoS path in the wireless terminal's current environment. This reduces the amount of data that has to be transmitted to update the prediction model. For example, only the weights in the matrix that are changed may be indicated in the message.

In one or more example methods, the message indicative of the trained prediction model comprises a time parameter indicative of a time duration for which the prediction model is valid. The time parameter may be dependent on a mobility parameter, such as based on the movement, of the wireless terminal to be positioned. For example, if the wireless terminal moves around a lot or with high velocity, the time parameter may indicate a first time duration, if the wireless terminal is stationary, the time parameter may indicate a second time duration being longer than the first time duration. After the time duration has expired the prediction model may no longer be valid, for example due to the environment of the wireless terminal changing. In one or more example methods, the first wireless node may receive a message comprising an updated prediction model from the positioning node or a different part of the trained prediction model, which may consider the new environment of the first wireless node.

In one or more example methods, the message indicative of the trained prediction model is indicative of a structure of a predictive neural network used to train the trained prediction model. In one or more example methods, the structure may comprise one or more of a number of stages, a type of stage, a number of interconnections, and a type of interconnection of the predictive neural network.

In one or more example methods, the structure of the predictive neural network used to train the prediction model can be preconfigured in the first wireless node.

In one or more example methods, the message indicative of the trained prediction model is one or more of a positioning measurement request message, a ranging request message, a positioning configuration information message, a positioning configuration update message, and an attach procedure message.

In one or more example methods, the trained prediction model is a universal trained prediction model. The universal trained prediction model may be a model useable by any wireless node for estimating the LoS path for a wireless terminal in one of a plurality of different environments and scenarios. The universal trained prediction model may, in some example prediction models, be unnecessarily large for a single wireless node, such as a base station or wireless terminal to store, as the wireless node would not need to calculate a LoS path in multiple different environment types at the same time. The LoS path for the wireless terminal may only be determined in the current environment of the wireless terminal, and therefore only a trained prediction model associated with the current environment of the wireless terminal may be used for positioning of the wireless terminal.

In one or more example methods, the trained prediction model is a prediction model associated with a specific base station. For example, in case there are a plurality of reference wireless nodes attached and/or connected to specific base-station, the positioning node may train the prediction model based on the input from the plurality of reference wireless nodes and may associate the trained prediction model with that specific base station. The trained prediction model associated with the specific base station may be configured to be applied by the first wireless node upon the first wireless node communicating with the specific base station.

In one or more example methods, the trained prediction model is a prediction model associated with a specific wireless terminal. For example, when the positioning measurement is performed in sidelink, such as when the first wireless node and the second wireless node are both wireless terminals, and there is a plurality of reference wireless nodes that can be discovered by a specific fixed wireless terminal, the prediction model may be associated with that specific fixed wireless terminal based on the input from the plurality of reference wireless nodes (using sidelink communication).

In one or more example methods, the trained prediction model is a prediction model associated with a specific area, such as a specific cell area or geographic area. For example, in case there are a plurality of reference wireless nodes in the same specific area, the prediction model may be trained based on the measurement information from those reference wireless nodes and may be associated with the area in which those reference wireless nodes are located. Area here can be a predefined area, the LMF knows the area definition.

Instead of the positioning node providing the universal prediction model, the prediction model may be associated with one or more of a specific base station, a specific wireless terminal, and a specific area, which may only be applied when communicating with the specific base station, the specific wireless terminal, and/or the specific area. Such a prediction model typically has a smaller size than the universal model, thereby allowing the reported signaling overhead to be reduced. This may however require a reporting association between the trained prediction model and the specific base station, the specific wireless terminal, and/or the specific area.

In one or more example methods, the message indicative of the trained prediction model comprises an identifier, ID, for identifying the specific base station, the specific wireless terminal and/or the specific area associated with the trained prediction model.

In one or more example methods, the message indicative of the trained prediction model is indicative of a reporting format that the first wireless node is to use to generate a channel measurement report being compatible with the trained prediction model. In one or more example methods, the reporting format comprises one or more of: the type of parameters and/or elements to be included in the channel measurement report and/or an order of the parameters in the channel measurement report. The parameters of the report may comprise one or more of a path information, a power delay profile, a Reference Signal Received Power (RSRP), an estimated Signal-to-Noise Ratio (SNR) and/or Signal-to-Interference-plus-Noise Ratio (SINR) of the signal, and a First Peak to Average Ratio (FPAR). The path information can further comprise indexes, power and/or delay of the detected paths from the power delay profile. The power of each path can be an absolute value in unit dBW or can be normalized to the RSRP which called reference signal received path power (RSRPP). Likewise, the delay can be in a form of absolute time of arrival (TOA) or can be a relative delay which is the time difference between the path and the first detected path. The channel measurement can be associated to receive (Rx) and/or transmit (Tx) spatial filter (beam). For example, in DL-based positioning, the channel measurements can be associated to the Rx beam of the wireless terminal for the reception of reference signal and/or the Tx beam of the wireless node (e.g., TRP) for the transmission of the reference signal.

The order of the parameters in the channel measurement report may, in one or more example methods, be indicated as an information matrix, such as a multipath information matrix comprising parameters of a plurality of measured signaling paths. For example, the message indicative of the trained prediction model may indicate that a measurement result is to be reported in a certain order according to the multipath information matrix. The method 200 comprises receiving S205, from the second wireless node, a reference signal, such as a positioning reference signal (PRS). The second wireless node may be a wireless terminal, such as a UE, for DL-based positioning and/or sidelink based positioning. The second wireless node may be a base station for UL-based positioning. The step S205 may correspond to message 1008 of the signaling diagram shown in FIG. 2*a*.

The method 200 comprises determining S207, based on the reference signal and the trained prediction model, an LoS path between the first wireless node and the second wireless node. The step S207 may correspond to step S107 performed by the positioning node and described in relation to FIG. 4, and message 1006 of the signaling diagram of FIG. 2*a*.

In one or more example methods, determining S207 comprises performing S207A a channel measurement based on the received reference signal. In one or more example methods, the channel measurement comprises a power delay profile measurement, a complex impulse response measurement, or a complex frequency response measurement of the channel. In other words, performing S207A the channel measurement may comprise performing S207AA a measurement of the power delay profile of the channel. The channel measurement can be associated to receive (Rx) and/or transmit (Tx) spatial filter (beam). For example, in DL-based positioning, the channel measurements can be associated to the Rx beam of the wireless terminal for the reception of reference signal and/or the Tx beam of the wireless node (e.g., TRP) for the transmission of the reference signal.

In one or more example methods, determining S207 the LoS path comprises generating S207D a channel measurement report on the performed channel measurements. The channel measurement report may be generated based on the reporting format indicated in the message indicative of the trained prediction model. For example, in response to the first wireless node receiving reference signals via a plurality of paths, the first wireless node may report a measurement result on the reference signals in the indicated reporting format, such as in the multipath information matrix.

In one or more example methods, the determining S207 comprises applying S207B the trained prediction model to the channel measurement. In one or more example methods, applying S207B the trained prediction model comprises applying the weights to the channel measurement. In one or more example methods, the determining S207 comprises determining S207C the LoS path based on the trained prediction model for the time duration. The first wireless node may determine the LoS path a plurality of times within the time duration. The time duration may indicate a time period for which the trained prediction model is valid.

In one or more example methods, the trained prediction model may be independent from an environment and/or a state of the wireless terminal. In other words, the prediction model may be a universal prediction model.

In one or more example methods, the trained prediction model may be dependent on an environment and/or a state of the wireless terminal. The first wireless node may therefore be provided with an updated prediction model after a period of time, which updated prediction model may correspond to the current environment and/or state of the wireless terminal.

In one or more example methods, upon expiry of the time period, the first wireless node may receive a message indicative of the updated trained prediction model. In one or more example methods, the message indicative of the updated trained prediction model may comprise a time parameter indicative of a time duration for which the updated trained prediction model is valid. This can also be in a form of the periodicity of trained prediction model updates. The first wireless node may then determine the LoS path based on the updated trained prediction model for the indicated time duration.

The wireless terminal is one of the first wireless node and the second wireless node. In one or more example methods, such as when the positioning measurement is performed in DL, the first wireless node is the wireless terminal and the second wireless is a base station. In other words, the wireless terminal receives the reference signal from the base station.

In one or more example methods, such as when the positioning measurement is performed in UL, the first wireless node is the base station, and the second wireless node is the wireless terminal. In other words, the base station receives the reference signal from the wireless terminal.

In one or more example methods, such as when the positioning measurement is performed in sidelink, the first wireless node is the wireless terminal, and the second wireless node is a second wireless terminal. In other words, the wireless terminal receives the reference signal from the second wireless terminal.

In one or more example methods, the method 200 comprises transmitting S209, to a positioning node, a positioning measurement report for the determined LoS path between the first wireless node and the second wireless node. The positioning measurement report may in one or more example methods, such as when the first wireless node is the wireless terminal, be transmitted to the positioning node via a base station. The step S209 may correspond to step S109 performed by the positioning node and described in relation to FIG. 4, and message 1012 of the signaling diagram of FIG. 2*a*.

In one or more example methods, the positioning measurement report is indicative of the trained prediction model, such as the trained prediction model matrix, based on which the LoS path has been determined. By providing an indication of the LoS path and/or an NLoS path and the indication of the trained prediction model based on which the LoS path and/or NLoS path has been determined, the positioning node may derive the LoS path using the indication and the indicated trained prediction model. Based on the indication of the LoS path and/or the NLoS path and the indication of the trained prediction model, the positioning node can derive the LoS path and/or the NLoS path without the first wireless node having to report a rich set of all paths measured by the first wireless node. Thereby, a signalling overhead in the system can be reduced.

FIG. 3 shows a flow diagram of an example method 100 performed by a positioning node according to the disclosure, for enabling positioning of a wireless terminal. The method 100 may be performed by a positioning node disclosed herein, such as the positioning node 900 of FIG. 6. The positioning node 900 may be a positioning network node 600 of FIG. 1*a*, such as an LS and/or an LMF, for UL and/or DL positioning methods. The positioning node 900 may be a wireless terminal, such as the wireless terminal 300A of FIG. 1*a*, for sidelink positioning methods. In one or more examples, the positioning node is a distributed network node, such as a network node distributed over a plurality of entities. In one or more example methods, where a modelling, such as a training of the prediction model, may be performed in a first entity of the distributed network node and a positioning, such as performing a positioning estimation, may be performed in a second entity of the distributed network node.

In one or more example methods, the method 100 comprises receiving S101, from the first wireless node, a message indicating a machine learning capability of the first wireless node. The machine learning capability may be indicative of the first wireless node's capability of receiving a trained prediction model, such as a machine learning model. In one or more example methods, the machine learning capability may be indicative of the first wireless node's capability of applying the trained prediction model, such as for determining an LoS path of the communication between the first wireless node and the second wireless node. The step S101 may correspond to step S201 performed by the first wireless node and described in relation to FIG. 3.

In one or more example methods, the message indicating the machine learning capability is indicative of one or more of: a matrix size, a type of prediction model, a number of prediction model layers, a number of prediction model neurons, and a number of inferences per time unit for the prediction model, that the first wireless node has capability to handle.

In one or more example methods, the method 100 comprises obtaining S103, from a reference wireless node, such as a Positioning Reference Unit (PRU), channel measurement information associated with the reference wireless node. The reference wireless node is a wireless node, such as a base station or a wireless terminal, for which the location is known. When the reference wireless node is a base station, the base station may be configured to receive reference signals in DL, such as being configured to receive reference signals from other base station. In one or more example methods, the reference wireless node may be associated with a network provider. The reference wireless node being associated with the network provider may herein mean the reference network node can be controlled by the network provider to provide information, such as channel measurement information, required for training of the prediction model.

The reference wireless node, such as the PRU, may report channel measurement information associated with the reference wireless node to the positioning node, such as to the LS and/or the LMF. The channel measurement information may comprise information about a channel obtained and/or observed by the reference wireless node, which information may be used to identify an LoS path of the observed channel.

In one or more example methods, the obtained channel measurement information associated with the reference wireless node comprises one or more of: a power delay profile, a complex impulse response measurement of the channel, a complex frequency response measurement of the channel, a power metric, a Signal to Noise Ratio (SNR), geographical coordinates indicating a location of the reference wireless node, and channel characteristics. The channel characteristics may comprise one or more of a path information, an RSRP, an SINR of the signal, and FPAR. The path information may comprise the indexes, power and delay of the detected paths from the power delay profile. The power of each path may be an absolute value, such as in unit dBW, or can be normalized to the RSRP, also referred to as a reference signal received path power (RSRPP).

In one or more example methods, the channel measurement information reported by the reference wireless node comprises an identifier for identifying the reference wireless node, such as a reference wireless node ID, such as a PRU ID. Based on the reference wireless node ID the positioning node can associate the channel measurement information with the reference wireless node performing the measurement.

In one or more example methods, the channel measurement information reported by the reference wireless node comprises an identifier for identifying a serving cell of the reference wireless node at the time of obtaining the channel measurement information. The identifier for identifying the serving cell may be a serving cell ID. Based on the serving cell ID the positioning node may associate the channel measurement information with the location of the reference wireless node at the time of the measurement. The channel measurement can be associated to receive (Rx) and transmit (Tx) spatial filter (beam). For example, in DL-based positioning, the channel measurements can be associated to the Rx beam of the wireless terminal for the reception of reference signal and/or the Tx beam of the wireless node (e.g., TRP) for the transmission of the reference signal.

In one or more example methods, the channel measurement information reported by the reference wireless node comprises a time stamp. The time stamp may indicate the time of obtaining the channel measurement information. The time stamp allows the positioning node to associate the channel measurement information with the time of the measurement.

In one or more example methods disclosed herein, the reference wireless node is a PRU as defined by the 3GPP work item for enhanced positioning of release 17. The PRU is a positioning measurement unit for which the location is known. In one or more examples of the method disclosed herein, the functionality of the PRU is extended and used as a tool to collect channel measurement information, such as channel quality information and/or channel condition information. The information may be measured by the PRU and may be reported to the positioning node, such as to the LS and/or the LMF, for training of a prediction model, such as a neural network model, for determining an LoS path.

The reference wireless nodes may support the positioning node in training the prediction model. The reference wireless nodes may be used to build the prediction models in the positioning node that may then be communicated to the first wireless node to assist the first wireless node in applying the prediction model for determining the LoS path, for example by assisting the first wireless node in applying prediction model weights, such as neural weights. Since the prediction model may be continuously trained, by the network, such as by the positioning node, based on real-time reports from a plurality of reference wireless nodes. Thereby, the performance of the LoS path determination can be improved compared to traditional methods, for any given propagation environment.

The step S103 may correspond to message 1002 of the signaling diagram of FIG. 2.

In one or more example methods, the method 100 comprises training S105 a prediction model, such as one or more prediction models, using a machine learning algorithm based on the obtained channel measurement information. To improve the accuracy of the learning model training of the prediction model may comprise updating, and/or modifying of the prediction model. The positioning node may train one or more prediction models based on the channel measurement information obtained from the reference wireless node, such as from the PRU. The one or more prediction models may be trained to identify the LoS path given, for example, a known exact location of the reference wireless node. In one or more example methods, the exact way the positioning node trains the prediction model is up to the implementation. In one or more example methods, the positioning node may provide the reported measurement from the reference wireless node as input to the prediction model and the actual geographical location of the reference wireless node as the expected prediction output. In one or more example methods, the actual location can be manually configured. For example, a user/operator may place the reference wireless node at a specific location and may manually enter the location, such as longitudinal and latitudinal coordinates of the reference wireless node. The reference wireless node may thus be manually configured with its actual geographical location.

In one or more example methods, the reference wireless node may perform a positioning estimation via a Global Positioning System (GPS) or any other form and report that location information.

The step S105 may correspond to step 1004 of the signaling diagram of FIG. 2.

In one or more example methods, the trained prediction model comprises a matrix of weights. The weights in the prediction model may in one or more examples be adjusted and optimized based on the input and the output via one or more algorithms, such as gradient based algorithms. The size of the matrix may be determined by the location network node and/or the first wireless node, depending on the accuracy level that the location network node and/or the first wireless node would like to achieve.

In one or more example methods, training S105 comprises training S105A the prediction models based on a group of reference wireless nodes, wherein the reference wireless nodes are grouped based on one or more of: a type of the reference wireless node, a location of the reference wireless node, and a serving cell ID of the reference wireless node. The trained prediction model may thus be associated with one or more of: a type of the wireless node, a location of the wireless node, and a serving cell ID.

In one or more example methods, the trained prediction model is a prediction model associated with one or more of: a specific base station, a specific wireless terminal, and a specific area.

In one or more example methods, the trained prediction model is a prediction model associated with a specific base station. For example, in case there are a plurality of reference wireless nodes attached and/or connected to specific base-station, the positioning node may train the prediction model based on the input from these reference wireless nodes and may associate the trained prediction model with that specific base station. The trained prediction model associated with the specific base station may be configured to be applied by the first wireless node upon the first wireless node communicating with the specific base station.

In one or more example methods, the trained prediction model is a prediction model associated with a specific wireless terminal. For example, when the positioning measurement is performed in sidelink, such as when the first wireless node and the second wireless node are both wireless terminals, and there is a plurality of reference wireless nodes that can be discovered by a specific fixed wireless terminal, the prediction model may be associated with that specific fixed wireless terminal based on the input from the plurality of reference wireless nodes (using sidelink communication).

In one or more example methods, the trained prediction model is a prediction model associated with a specific area. For example, in case there are a plurality of reference wireless nodes in the same specific area, the prediction model may be trained based on the measurement information from those reference wireless nodes and may be associated with the area in which those reference wireless nodes are located. Area here can be a predefined area, the LMF knows the area definition.

In one or more example methods, the message indicative of the trained prediction model comprises an identifier, ID, for identifying the specific base station, the specific wireless terminal and/or the specific area associated with the trained prediction model.

The method 100 comprises, transmitting S107, to the first wireless node, a message indicative of the trained prediction model, to be used for determining a line-of-sight, LoS, path between the first wireless node and a second wireless node during positioning of the first wireless node. The message indicative of the trained prediction model may be transmitted to the first wireless node via a second wireless node, such as via a base station or a wireless terminal.

In one or more example methods, the transmitting S107 comprises selecting S107A one of the one or more prediction models to be transmitted to the first wireless node based on the machine learning capability of the first wireless node.

In one or more example methods, the transmitting S107 comprises selecting S107B one of the one or more trained prediction models to be transmitted to the first wireless node based on one or more of: an environment of the first wireless node, a location of the first wireless node, a state of the wireless node, and a type of the first wireless node. The location of the wireless node may be a serving cell of the first wireless node.

The method 100 comprises receiving S109, from the first wireless node, a positioning measurement report indicative of a determined LoS path between the first wireless node and the second wireless node. In one or more example methods disclosed herein, instead of reporting a rich set of paths and parameters of the measured channel, the positioning measurement report may comprise an indication indicative of the LoS path and/or the NLoS path. The indication indicative of the LoS path and/or the NLoS path, may be an LoS indication and/or NLoS indication as specified in 3GPP NR Rel-17.

In one or more example methods, the positioning measurement report is indicative of the trained prediction model based on which the LoS path has been determined by the first wireless node. Based on the indication of the LoS path and/or NLoS path and the trained prediction model based on which the LoS path and/or NLoS path has been determined, the positioning node may derive the LoS path. Thereby, an increased positioning accuracy and a reduced signaling overhead in the system can be achieved.

Figure 5:
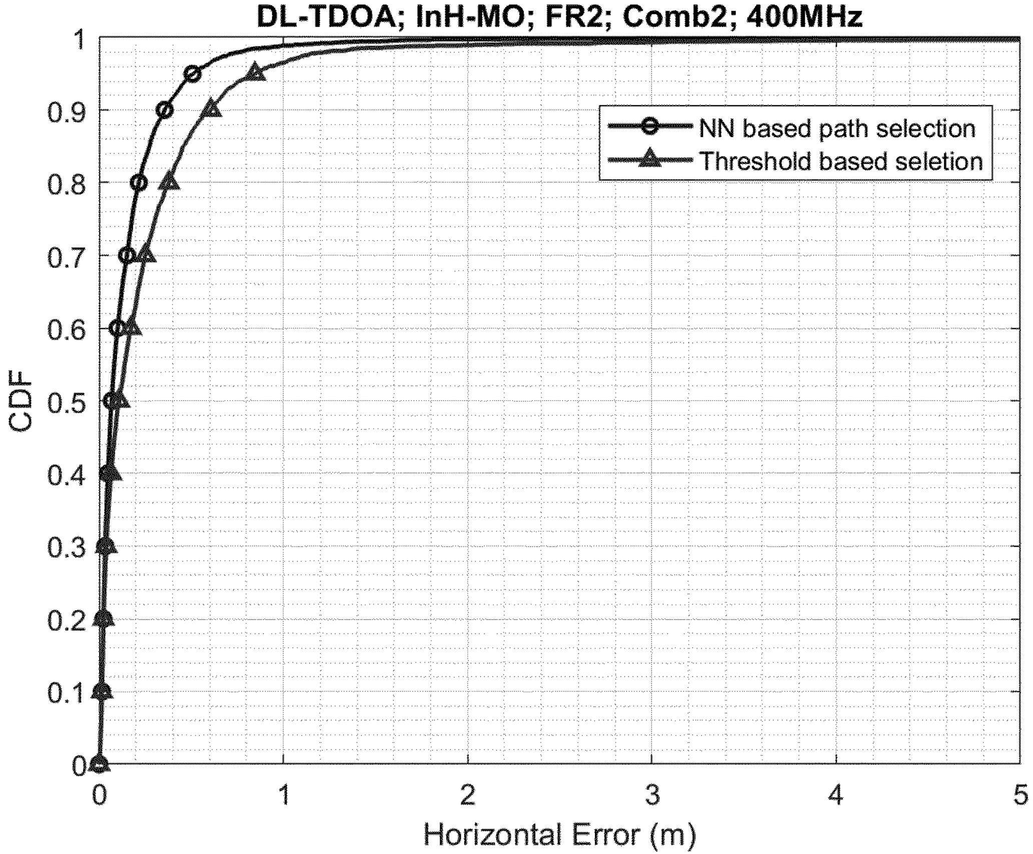
FIG. 5 is a graph showing a performance evaluation of the method for enabling positioning of the wireless terminal according to this disclosure.

FIG. 5 is a graph showing a performance evaluation comparing the machine learning based and the TH-based path selection method. The performance evaluation is performed using DL Time Difference of Arrival (DL-TDOA) positioning technique in frequency range 2 (FR2). The performance evaluation shows that the machine learning based method provides a higher accuracy than the TH-based method. In the tests, for 90% of the wireless terminals, the machine learning based method performs with approximately 0.38 m accuracy while the TH method performs with approximately 0.62 m accuracy. In the graph the X-axis shows the horizontal positioning error and the Y-axis shows the cumulative distribution function.

In one or more example methods, the message indicative of the trained prediction model is indicative of a reporting format, such as a reporting structure, that the first wireless node is to use to generate a channel measurement report being compatible with the trained prediction model. In one or more example methods, the reporting format comprises one or more of: the type of parameters and/or elements to be included in the channel measurement report and/or an order of the parameters in the report. The parameters of the report may comprise one or more of a path information, a Reference Signal Received Power (RSRP), an estimated SNR/SINR of the signal, and a First Peak to Average Ratio (FPAR).

The order of the parameters may in one or more example methods be indicated as an information matrix, such as a multipath information matrix comprising parameters of a plurality of measured signaling paths. For example, the message indicative of the trained prediction model may indicate that a measurement result is to be reported in a certain order according to the multipath information matrix.

In one or more example methods, the message indicative of the trained prediction model comprises a time parameter indicative of a time duration for which the trained prediction model is valid. The trained prediction model may, in one or more example methods, be dependent on an environment and/or a state of the wireless terminal. Hence, the provided prediction model may only be valid for a certain time duration, such as until the state of the wireless terminal changes.

In one or more example methods, the message indicative of the trained prediction model is indicative of a full trained prediction model, such as a full trained prediction model matrix.

In one or more example methods, the message indicative of the trained prediction model is indicative of a part of the trained prediction model, such as of a part of the trained prediction model matrix. In one or more example methods, such as when the trained prediction model is updated, only the part of the trained prediction model that has been changed may be indicated. This reduces the amount of data that has to be transmitted to update the prediction model. For example, only the weights in the matrix that are changed may be indicated in the message.

The step S107 may correspond to step S203 performed by the first wireless node and described in relation to FIG. 3, and message 1006 of the signaling diagram of FIG. 2.

In one or more example methods, the first wireless node is the wireless terminal, and the second wireless node is a base station.

In one or more example methods, the first wireless node is a base station, and the second wireless node is the wireless terminal.

In one or more example methods, the first wireless node is the wireless terminal, and the second wireless node is a second wireless terminal.

In one or more example methods, the trained prediction model is a predictive neural network. In one or more example methods, the message indicative of the trained prediction model is indicative of a structure of the predictive neural network. In one or more example methods, the structure of the predictive neural network may comprise one or more of a number of stages, a type of stage, a number of interconnections, and a type of interconnection of the predictive neural network. In one or more example methods, the structure of the neural network is used as a guideline indicating to the first wireless node how the inference operation works. For example, the first wireless node may receive multiple matrices which represent different stages in the neural network, such as in the trained prediction model. The first wireless node may be instructed to apply each stage of the trained prediction model in a certain order. After applying a first stage, such as a first layer, the first wireless node may need to further process the output (such as using convolution), to make it fit into a second stage. Indicating the type of stages may thus aid the first wireless node in the further processing of the output for the following stages.

Figure 6:
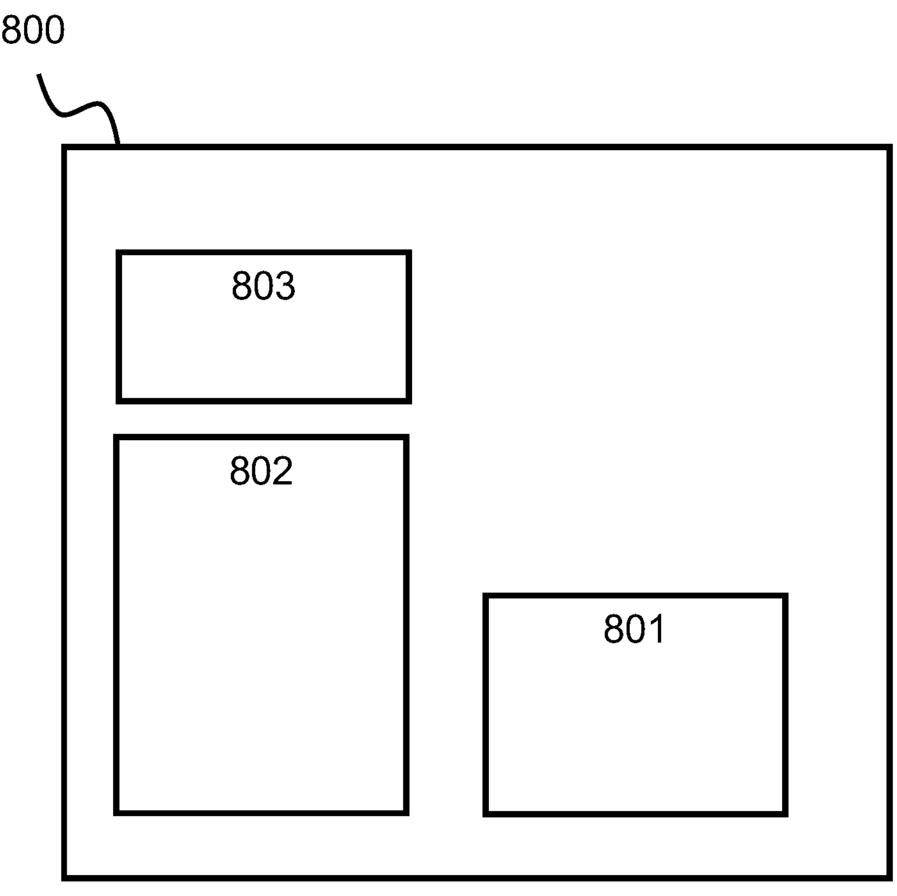
FIG. 6 is a block diagram illustrating an example first wireless node according to this disclosure.

FIG. 6 shows a block diagram of an example first wireless node 800 according to the disclosure. The first wireless node 800 comprises memory circuitry 801, processor circuitry 802, and a communication interface 803. The first wireless node 800 may be configured to perform any of the methods disclosed in FIG. 3. In other words, the first wireless node 800 may be configured enabling estimation of a position of a wireless terminal.

In one or more examples, such as when the positioning measurement is performed in DL, the first wireless node is a wireless terminal, such as the wireless terminal 300 of FIG. 1*a*.

In one or more examples, the first wireless node is a base station, such as the base station 400 of FIG. 1.

In one or more example methods, such as when the positioning measurement is performed in sidelink, the first wireless node is a wireless terminal, such as the wireless terminal 300 in FIG. 1*a*.

The first wireless node 800 is configured to receive (such as via the communication interface 803), from a positioning node, a message indicative of a trained prediction model for determining an LoS path associated with the first wireless node during positioning of the first wireless node, such as an LoS path between the first wireless node and a second wireless node during positioning of the first wireless node. The message indicative of the trained prediction model may be received directly from the positioning node or via a second wireless node, such as via a base station or a wireless terminal.

The first wireless node 800 is configured to receive (such as via the wireless interface 803), from the second wireless node, a reference signal.

The first wireless node 800 is configured to determine (such as using the processor circuitry 802), based on the reference signal and the trained prediction model, a line-of-sight, LoS, path between the first wireless node and the second wireless node.

In one or more example first wireless nodes, the wireless terminal is one of the first wireless node and the second wireless node.

The communication interface 803 may be configured for wired communication and/or wireless communication via a wireless communication system, such as a 3GPP system, such as a 3GPP system supporting one or more of: New Radio, NR, Narrow-band IoT, NB-IoT, and Long Term Evolution (LTE), LTE—enhanced Machine Type Communication, LTE-M, millimeter-wave communications, such as millimeter-wave communications in licensed/unlicensed bands, such as device-to-device millimeter-wave communications in licensed/unlicensed bands.

Processor circuitry 802 is optionally configured to perform any of the operations disclosed in FIG. 3 (such as any one or more of S201, S207A, S207AA, S207B, S207C, S207D, S209). The operations of the first wireless node 800 may be embodied in the form of executable logic routines (for example, lines of code, software programs, etc.) that are stored on a non-transitory computer readable medium (for example, memory circuitry 801) and are executed by processor circuitry 802).

Furthermore, the operations of the first wireless node 800 may be considered a method that the first wireless node 800 is configured to carry out. Also, while the described functions and operations may be implemented in software, such functionality may also be carried out via dedicated hardware or firmware, or some combination of hardware, firmware and/or software.

Memory circuitry 801 may be one or more of a buffer, a flash memory, a hard drive, a removable media, a volatile memory, a non-volatile memory, a random access memory (RAM), or other suitable device. In a typical arrangement, memory circuitry 801 may include a non-volatile memory for long term data storage and a volatile memory that functions as system memory for processor circuitry 802. Memory circuitry 801 may exchange data with processor circuitry 802 over a data bus. Control lines and an address bus between memory circuitry 801 and processor circuitry 802 also may be present (not shown in FIG. 6). Memory circuitry 801 is considered a non-transitory computer readable medium.

Memory circuitry 801 may be configured to store information such as a message indicative of a trained prediction model, prediction model matrix, positioning measurement report, the message indicating the machine learning capability, and the message indicative of the trained prediction model in a part of the memory.

Figure 7:
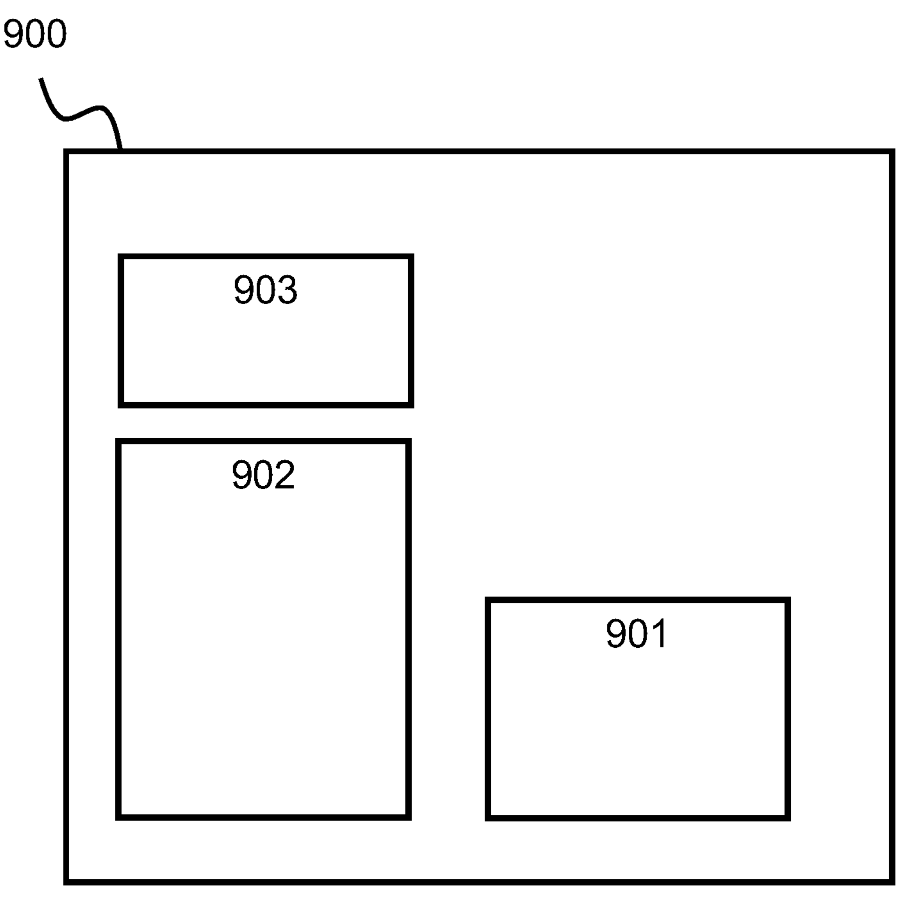
FIG. 7 is a block diagram illustrating an example positioning node according to this disclosure.

FIG. 7 shows a block diagram of an example positioning node 900 according to the disclosure. The positioning node 900 comprises memory circuitry 901, processor circuitry 902, and a communication interface 903. The positioning node 900 may be configured to perform any of the methods disclosed in FIG. 4. In other words, the positioning node 900 may be configured for enabling positioning of a wireless terminal.

The positioning node 900 is configured to transmit (such as via the wireless interface 903), to the first wireless node, a message indicative of the trained prediction model, to be used for determining a LoS path between the first wireless node and a second wireless node during positioning of the first wireless node.

The positioning node 900 is configured to receive (such as via the communication interface 903), from the first wireless node, a positioning measurement report.

In one or more positioning nodes, the positioning measurement report is indicative of a determined LoS path between the first wireless node and the second wireless node. The wireless terminal is one of the first wireless node and the second wireless node.

The communication interface 903 is configured for communication with a wireless communication system, such as a 3GPP system, such as a 3GPP system supporting one or more of: New Radio, NR, Narrow-band IoT, NB-IoT, and Long Term Evolution—enhanced Machine Type Communication, LTE-M, millimeter-wave communications, such as millimeter-wave communications in licensed bands, such as device-to-device millimeter-wave communications in licensed bands.

Figure 4:
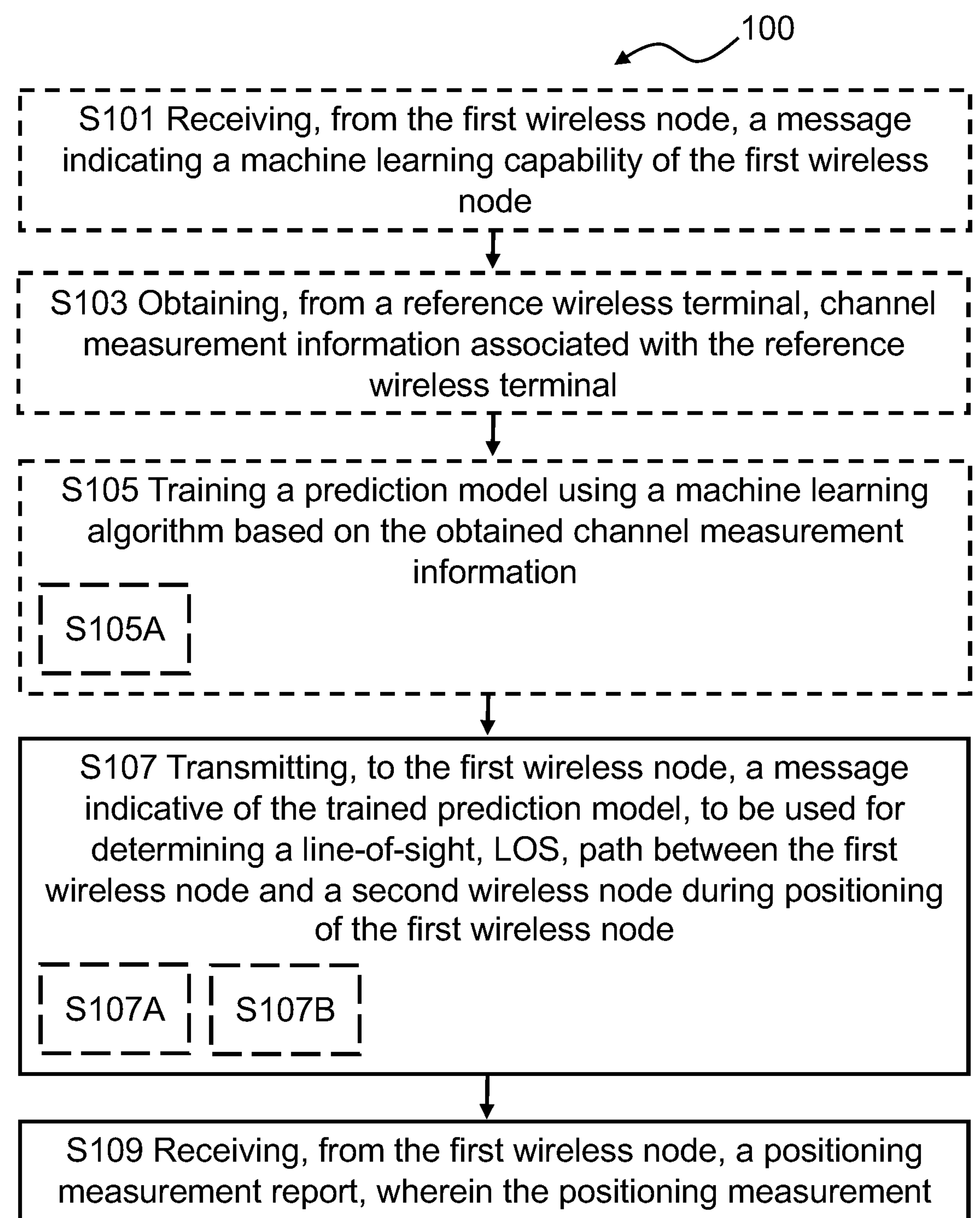
FIG. 4 is a flow-chart illustrating an example method, performed in a positioning node of a wireless communication system, for enabling positioning of a wireless terminal according to this disclosure.

The positioning node 900 is optionally configured to perform any of the operations disclosed in FIG. 4 (such as any one or more of S101, S103, S105, S105A, S107A, S107B). The operations of the positioning node 900 may be embodied in the form of executable logic routines (for example, lines of code, software programs, machine learning programs, prediction models, etc.) that are stored on a non-transitory computer readable medium (for example, memory circuitry 901) and are executed by processor circuitry 902).

The processor circuitry 902 described herein may apply artificial intelligence and/or be trained using supervised or unsupervised machine learning, and the machine learning program can employ a neural network. The neural network may be one or more of: a convolutional neural network, a deep learning neural network, and a combined learning module or program. Machine learning may be seen as identifying and/or recognizing patterns in existing data (such as channel measurement information, input data, and/or device data form a reference wireless node) in order to facilitate making predictions for subsequent data, such as issue parameter output, such as an output of a LoS path based on channel measurement information from a wireless terminal that is to be located. Models may be created based on example inputs in order to make valid and reliable predictions for novel inputs and/or outputs. Additionally or alternatively, the prediction model and related machine learning programs may be trained by inputting sample data sets or certain data into the programs, such as input data, channel measurement information data, device data, and/or numerical analysis thereof. The trained prediction model may utilize deep learning algorithms that may be primarily focused on pattern recognition, and may be trained after processing multiple examples.

In supervised machine learning, the processor circuitry 902 described herein may be provided with example inputs and their associated outputs (such as channel measurements performed by a reference wireless node and the actual position of the reference wireless node), and may seek to discover a general rule that maps inputs to outputs, so that when subsequent novel inputs are provided the processor circuitry 902 may, based upon the discovered rule, accurately predict the correct output. In unsupervised machine learning, the processor circuitry 902 may be required to find its own structure in unlabeled example inputs. In one or more examples, machine learning techniques may be used to extract data from input data set, such as a set of channel measurements, and/or other data sets. Based on these analyses, the processing element may learn how to identify characteristics and patterns (such as channel measurement pattern(s)) that may then be applied to training the prediction model, and predicting the issue parameter, such as the LoS path and/or NLoS path disclosed herein. Furthermore, the operations of the positioning node 900 may be considered a method that the positioning node 900 is configured to carry out. Also, while the described functions and operations may be implemented in software, such functionality may also be carried out via dedicated hardware or firmware, or some combination of hardware, firmware and/or software.

Memory circuitry 901 may be one or more of a buffer, a flash memory, a hard drive, a removable media, a volatile memory, a non-volatile memory, a random access memory (RAM), or other suitable device. In a typical arrangement, memory circuitry 901 may include a non-volatile memory for long term data storage and a volatile memory that functions as system memory for processor circuitry 902. Memory circuitry 901 may exchange data with processor circuitry 902 over a data bus. Control lines and an address bus between memory circuitry 901 and processor circuitry 902 also may be present (not shown in FIG. 7). Memory circuitry 901 is considered a non-transitory computer readable medium.

Memory circuitry 901 may be configured to store information such as a positioning measurement report, channel measurement information, prediction model matrix, and a message indicating a machine learning capability in a part of the memory.

Examples of methods and products (wireless node and positioning node) according to the disclosure are set out in the following items:

Item 1. A method performed by a first wireless node for enabling estimation of a position of a wireless terminal, the method comprising:

receiving (S203), from a positioning node, a message indicative of a trained prediction model for determining a line-of-sight, LoS, path associated with the first wireless node during positioning of the first wireless node, receiving (S205), from the second wireless node, a reference signal, determining (S207), based on the reference signal and the trained prediction model, a line-of-sight, LoS, path between the first wireless node and the second wireless node, wherein the wireless terminal is one of the first wireless node and the second wireless node.

Item 2. The method according to item 1, wherein the method comprises:

transmitting (S209), to a positioning node, a positioning measurement report for the determined LoS path between the first wireless node and the second wireless node.

Item 3. The method according to item 1 or 2, wherein determining (S207) comprises performing (S207A) a channel measurement based on the received reference signal.

Item 4. The method according to item 3, wherein the message indicative of the trained prediction model is indicative of a reporting format that the first wireless node is to use to generate a channel measurement report being compatible with the trained prediction model.

Item 5. The method according to any one of the items 1 to 4, wherein determining (S207) comprises applying (S207B) the trained prediction model to the channel measurement.

Item 6. The method according to item 5, wherein the trained prediction model comprises a matrix of weights, and wherein applying (S207B) the trained prediction model comprises applying the weights to the channel measurement.

Item 7. The method according to item 6, wherein the message indicative of the trained prediction model is indicative of a full trained prediction model matrix.

Item 8. The method according to item 6, wherein the message indicative of the trained prediction model is indicative of a part of the trained prediction model matrix.

Item 9. The method according to any one of the items 1 to 8, wherein the message indicative of the trained prediction model comprises a time parameter indicative of a time duration for which the prediction model is valid, and wherein determining (S207) comprises determining (S207C) the LoS path based on the trained prediction model for the time duration.

Item 10. The method according to any one of the items 1 to 9, wherein the positioning measurement report is indicative of the trained prediction model based on which the LoS path has been determined.

Item 11. The method according to any one of items 1 to 10, wherein the message indicative of the trained prediction model is indicative of a structure of a predictive neural network used to train the trained prediction model.

Item 12. The method according to any one of the items 1 to 11, wherein the message indicative of the trained prediction model is one or more of a positioning measurement request message, a ranging request, a positioning configuration information message, a positioning configuration update message, and an attach procedure message.

Item 13. The method according to any one of the items 1 to 12, wherein the method comprises:

sending (S201), to the positioning node, a message indicating a machine learning capability of the first wireless node.

Item 14. The method according to item 13, wherein the message indicating the machine learning capability is indicative of one or more of:

a matrix size, a type of prediction model, a number of prediction model layers, a number of prediction model neurons, and a number of inferences per time unit for the trained prediction model that the first wireless node has capability to handle.

Item 15. The method according to any one of the items 1 to 14, wherein the first wireless node is the wireless terminal, and the second wireless node is a base station.

Item 16. The method according to any one of the items 1 to 14, wherein the first wireless node is a base station, and the second wireless node is the wireless terminal.

Item 17. The method according to any one of the items 1 to 14, wherein the first wireless node is the wireless terminal, and the second wireless node is a second wireless terminal.

Item 18. The method according to any one of items 15 to 17, wherein the trained prediction model is a prediction model associated with one or more of:

a specific base station, a specific wireless terminal, a specific area.

Item 19. The method according to item 18, wherein the message indicative of the trained prediction model comprises an identifier, ID, for identifying the specific base station and/or the specific area associated with the trained prediction model.

Item 20. A method performed by a positioning node for enabling positioning of a wireless terminal, the method comprising:

transmitting (S107), to the first wireless node, a message indicative of the trained prediction model, to be used for determining a line-of-sight, LoS, path between the first wireless node and a second wireless node during positioning of the first wireless node, and receiving (S109), from the first wireless node, a positioning measurement report, wherein the positioning measurement report is indicative of a determined LoS path between the first wireless node and the second wireless node, wherein the wireless terminal is one of the first wireless node and the second wireless node.

Item 21. The method according to item 20, wherein the method comprises:

obtaining (S103), from a reference wireless node, channel measurement information associated with the reference wireless node, and training (S105) a prediction model using a machine learning algorithm based on the obtained channel measurement information.

Item 22. The method according to item 20 or 21, wherein the positioning measurement report is indicative of the trained prediction model based on which the LoS path has been determined by the first wireless node.

Item 23. The method according to any one of the items 20 to 22, wherein the message indicative of the trained prediction model is indicative of a reporting format that the first wireless node is to use to generate a channel measurement report being compatible with the trained prediction model.

Item 24. The method according to any one of the items 20 to 23, wherein the message indicative of the trained prediction model comprises a time parameter indicative of a time duration for which the trained prediction model is valid.

Item 25. The method according to any one of the items 20 to 24, wherein the trained prediction model comprises a matrix of weights.

Item 26. The method according to items 20 to 25, wherein the message indicative of the trained prediction model is indicative of a full trained prediction model matrix, or a part of a trained prediction model matrix.

Item 27. The method according to any one of the items 20 to 26, wherein the first wireless node is the wireless terminal, and the second wireless node is a base station.

Item 28. The method according to any one of the items 20 to 26, wherein the first wireless node is a base station, and the second wireless node is the wireless terminal.

Item 29. The method according to any one of the items 20 to 26, wherein the first wireless node is the wireless terminal, and the second wireless node is a second wireless terminal.

Item 30. The method according to any one of items 27 to 29, wherein the trained prediction model is a prediction model associated with one or more of:

a specific base station, a specific wireless terminal, a specific area.

Item 31. The method according to item 30, wherein the message indicative of the trained prediction model comprises an identifier, ID, for identifying the specific base station and/or the specific area associated with the trained prediction model.

Item 32. The method according to any one of the items 20 to 31, wherein the trained prediction model is a predictive neural network.

Item 33. The method according to item 32, wherein the message indicative of the trained prediction model is indicative of a structure of the predictive neural network.

Item 34. The method according to any one of items 20 to 33, wherein the method comprises:

receiving (S101), from the first wireless node, a message indicating a machine learning capability of the first wireless node.

Item 35. The method according to item 34, wherein the message indicating the machine learning capability is indicative of one or more of:

a matrix size, a type of prediction model, a number of prediction model layers, a number of prediction model neurons, and a number of inferences per time unit for the prediction model, that the first wireless node has capability to handle.

Item 36. The method according to any one of items 34 to 35, wherein transmitting (S107) comprises selecting (S107A) one of the one or more prediction models to be transmitted to the first wireless node based on the machine learning capability of the first wireless node.

Item 37. The method according to any one of items 20 to 36, wherein transmitting (S107) comprises selecting (S107B) one of the one or more prediction models to be transmitted to the first wireless node based on one or more of:

an environment of the first wireless node, a location of the first wireless node, a state of the wireless node, and a type of the first wireless node.

Item 38. The method according to any one of the items 20 to 37, wherein the obtained channel measurement information associated with the reference wireless device comprises one or more of:

a power delay profile, a power metrics, a Signal to Noise Ratio, SNR, geographical coordinates indicating a location of the reference wireless device, channel characteristics, a reference wireless device identifier, ID, a serving cell ID, and a time stamp of the channel measurement.

Item 39. The method according to any one of items 20 to 38, wherein training (S105) comprises training (S105A) the prediction models based on a group of reference wireless devices, wherein the reference wireless devices are grouped based on one or more of:

a type of the reference wireless node, a location of the reference wireless node, and a serving cell ID of the reference wireless node.

Item 40. A first wireless node comprising memory circuitry, processor circuitry, and a wireless interface, wherein the first wireless node is configured to perform any of the methods according to any of items 1-19.

Item 41. A positioning node comprising memory circuitry, processor circuitry, and a wireless interface, wherein the positioning node is configured to perform any of the methods according to any of items 20-39.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-6 comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented.

Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Language of degree used herein, such as the terms "approximately," "about," "generally," and "substantially" as used herein represent a value, amount, or characteristic close to the stated value, amount, or characteristic that still performs a desired function or achieves a desired result.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method performed by a first wireless node for enabling estimation of a position of a wireless terminal, the method comprising:
   receiving, from a positioning node, a message indicative of a trained prediction model for determining a line-of-sight (LoS) path associated with the first wireless node during positioning of the first wireless node,
   receiving, from a second wireless node, a reference signal,
   determining, based on the reference signal and the trained prediction model, a line-of-sight (LoS) path between the first wireless node and the second wireless node,
   wherein the wireless terminal is one of the first wireless node and the second wireless node.

2. The method according to claim 1, wherein the method comprises:
   transmitting, to a positioning node, a positioning measurement report for the determined LoS path between the first wireless node and the second wireless node.

3. The method according to claim 1, wherein determining comprises performing a channel measurement based on the received reference signal.

4. The method according to claim 3 wherein the message indicative of the trained prediction model is indicative of a reporting format that the first wireless node is to use to generate a channel measurement report being compatible with the trained prediction model.

5. The method according to claim 1, wherein determining comprises applying the trained prediction model to the channel measurement.

6. The method according to claim 5, wherein the trained prediction model comprises a matrix of weights, and wherein applying the trained prediction model comprises applying the weights to the channel measurement.

7. The method according to claim 6, wherein the message indicative of the trained prediction model is indicative of a full trained prediction model matrix.

8. The method according to claim 6, wherein the message indicative of the trained prediction model is indicative of a part of the trained prediction model matrix.

9. The method according to claim 1, wherein the message indicative of the trained prediction model comprises a time parameter indicative of a time duration for which the prediction model is valid, and wherein determining comprises determining the Los path based on the trained prediction model for the time duration.

10. The method according to claim 1, wherein the positioning measurement report is indicative of the trained prediction model based on which the Los path has been determined.

11. The method according to claim 1, wherein the message indicative of the trained prediction model is indicative of a structure of a predictive neural network used to train the trained prediction model.

12. The method according to claim 1, wherein the message indicative of the trained prediction model is one or more of a positioning measurement request message, a ranging request, a positioning configuration information message, a positioning configuration update message, and an attach procedure message.

13. The method according to claim 1, wherein the method comprises:
   sending, to the positioning node, a message indicating a machine learning capability of the first wireless node.

14. The method according to claim 13, wherein the message indicating the machine learning capability is indicative of one or more of:
   a matrix size,
   a type of prediction model,
   a number of prediction model layers,
   a number of prediction model neurons, and
   a number of inferences per time unit for the trained prediction model that the first wireless node has capability to handle.

15. The method according to claim 1, wherein the first wireless node is the wireless terminal, and the second wireless node is a base station.

16. The method according to claim 1, wherein the first wireless node is a base station, and the second wireless node is the wireless terminal.

17. The method according to claim 1, wherein the first wireless node is the wireless terminal, and the second wireless node is a second wireless terminal.

18. The method according to claim 15, wherein the trained prediction model is a prediction model associated with one or more of:

a specific base station, a specific wireless terminal, a specific area.

19. The method according to claim 18, wherein the message indicative of the trained prediction model comprises an identifier (ID) for identifying the specific base station and/or the specific area associated with the trained prediction model.

20. A method performed by a positioning node for enabling positioning of a wireless terminal, the method comprising:

transmitting, to the first wireless node, a message indicative of the trained prediction model, to be used for determining a line-of-sight (LoS) path between the first wireless node and a second wireless node during positioning of the first wireless node, and receiving, from the first wireless node, a positioning measurement report, wherein the positioning measurement report is indicative of a determined LoS path between the first wireless node and the second wireless node, wherein the wireless terminal is one of the first wireless node and the second wireless node.

* * * * *